United States Patent Office.

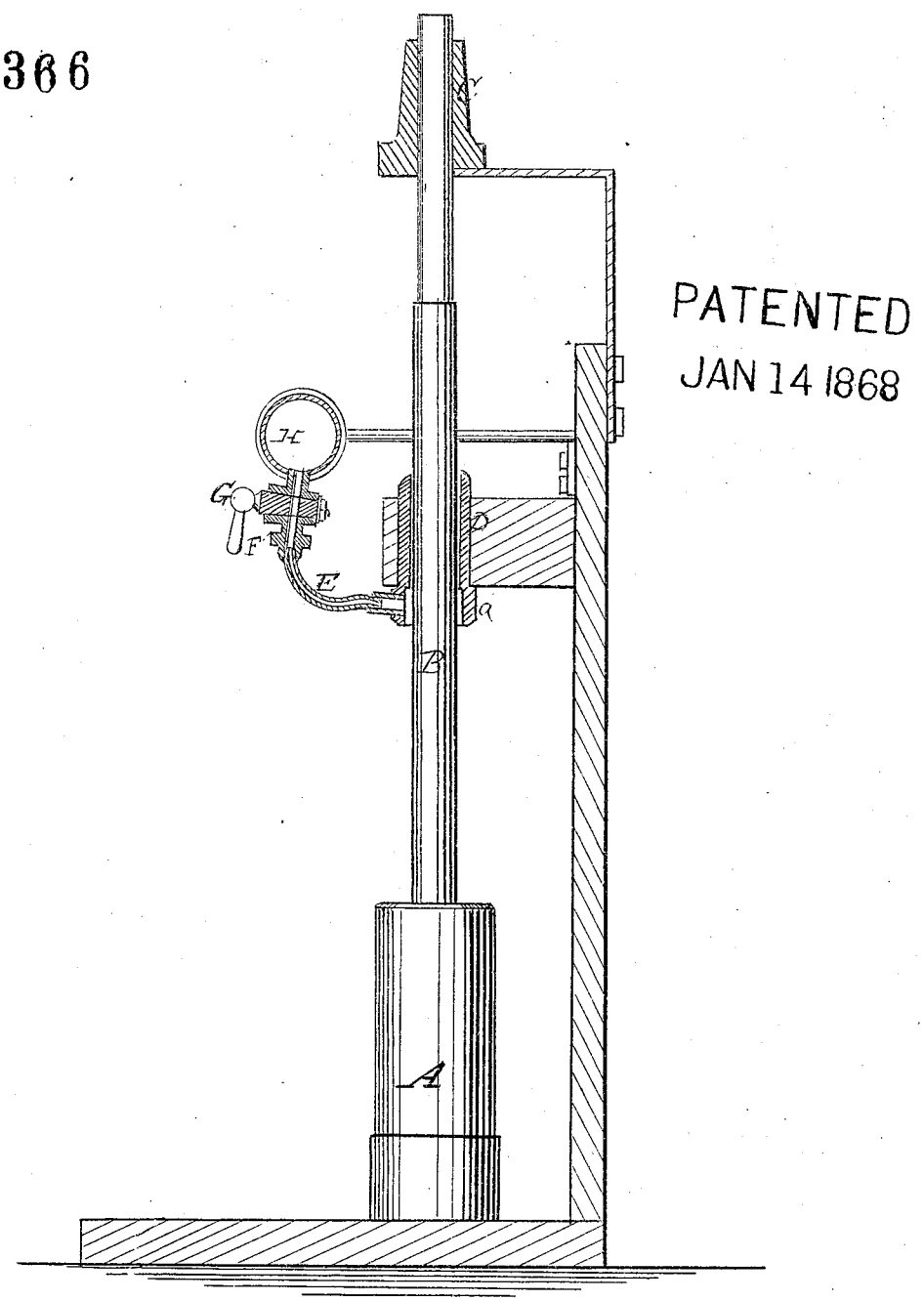

GEORGE R. MITCHELL, OF NEVADA, COLORADO.

Letters Patent No. 73,366, dated January 14, 1868.

---

IMPROVEMENT IN STAMP-MILLS.

---

The Schedule referred to in these Letters Patent and making part of the same.

---

TO ALL WHOM IT MAY CONCERN:

Be it known that I, GEORGE R. MITCHELL, of Nevada, in the county of Gilpin, and Territory of Colorado, have invented a new and useful Improvement in Stamp-Mills for crushing quartz; and that the following description, taken in connection with the accompanying drawing, hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

The chief difficulty attending the operation of stamp-mills for crushing quartz, consists in the wearing of the stems and the lower boxes of the same, a result due to the adhesion of pulverized rock or quartz to the stems, and the introduction of the pulverized rock or quartz into the boxes, by the elevation or upward movement of the stems. My invention fully obviates this difficulty; and it consists in introducing into the lower boxes of the stems, water from a supply-pipe, and in such a manner as to keep the stems perfectly clean or free from the pulverized quartz, and also keep the stems in a perfectly-lubricated state.

The accompanying drawing represents a side sectional view of a stamp having my improvement applied to it.

A represents a stamp of a stamp-mill, and B the stem thereof, working in bearings C D. The upper bearing, C, may be of usual construction, but the lower one, D, is rather larger in diameter internally, at its lower end, than at any other part, and this enlarged portion forms a water-chamber, $a$, which communicates, by means of an elastic hose, E, with a metal tube, F, the latter being provided with a stop-cock, G. The tube F is connected to and communicates with a water-supply pipe, H, as shown clearly in the drawing.

It will be seen, from the above description, that the stamp-mill is supplied with water through the lower bearings, D, it being understood that in a stamp-mill a series of stamps is used, and the crushed or pulverized quartz (pulp) carried off by a flow or current of water through the box in which the stamps work. The flow of water from the pipe H is regulated by the cocks G. The water passes from the chambers $a$ down around the stems B, keeping the latter clean, or perfectly free from pulverized rock or quartz, and also keeps the lower bearings in a perfectly-lubricated state while the mill is in operation.

Having thus described my invention, I claim as new, and desire to secure by Letters Patent—

1. The bearing D, having the lower portion enlarged, forming a water-chamber, $a$, substantially as described.

2. In combination with the above, and with the stem B of stamp A, I claim the water-supply pipe H, tube F, stop-cock G, and flexible hose E, substantially as described and for the purpose specified.

The above specification of my invention signed by me, this 16th day of November, 1866.

GEORGE R. MITCHELL.

Witnesses:
 HORACE H. ATKINS,
 EDWD. B. STILLINGS.